US006882724B2

(12) United States Patent
Hartmeier

(10) Patent No.: US 6,882,724 B2
(45) Date of Patent: Apr. 19, 2005

(54) SYSTEM AND METHOD FOR PROVIDING CALL STATISTICS IN REAL TIME

(75) Inventor: Martina K. Hartmeier, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 578 days.

(21) Appl. No.: 10/092,821

(22) Filed: Mar. 6, 2002

(65) Prior Publication Data

US 2002/0150231 A1 Oct. 17, 2002

Related U.S. Application Data

(63) Continuation of application No. 09/189,094, filed on Nov. 9, 1998, now Pat. No. 6,404,883, which is a continuation of application No. 08/670,834, filed on Jun. 28, 1996, now Pat. No. 5,864,616.

(51) Int. Cl.[7] .............................. H04M 3/00; H04M 5/00
(52) U.S. Cl. .............................. 379/265.03; 379/265.06; 370/354
(58) Field of Search ........................... 379/93.17, 93.23, 379/100.13, 201.02, 201.04, 201.05, 201.07, 201.08, 201.09, 112.01, 114.01, 266.01, 266.06, 266.08, 266.1, 265.01–265.03, 265.09, 265.06; 370/352–356

(56) References Cited

U.S. PATENT DOCUMENTS

| 4,510,351 A | 4/1985 | Costello et al. |
| 5,153,909 A | 10/1992 | Beckle et al. |
| 5,206,903 A | 4/1993 | Kohler et al. |
| 5,386,464 A | 1/1995 | Pruitt |
| 5,436,966 A | 7/1995 | Barrett et al. |
| 5,450,480 A | 9/1995 | Man et al. |
| 5,511,116 A | 4/1996 | Snastry et al. |
| 5,555,299 A | 9/1996 | Maloney |
| 5,696,811 A | 12/1997 | Maloney et al. |
| 5,757,904 A | 5/1998 | Anderson |
| 5,793,861 A | 8/1998 | Haigh |
| 5,802,163 A | 9/1998 | Miloslavsky |
| 5,825,869 A | 10/1998 | Brooks et al. |
| 5,864,616 A | 1/1999 | Hartmeier |
| 5,884,032 A | 3/1999 | Bateman et al. |
| 6,404,883 B1 * | 6/2002 | Hartmeier .............. 379/265.03 |

OTHER PUBLICATIONS

Harry Newton, Newton's Telecom Dictionary, Nov. 1994, Flatiron Publishing, Inc., ISBN 0–936648–60–0, pp. 405, 606, and 1010–1011.

* cited by examiner

Primary Examiner—Roland G. Foster
Assistant Examiner—V. Towler
(74) Attorney, Agent, or Firm—Blakely, Sokoloff, Taylor & Zafman LLP

(57) ABSTRACT

A display tool and a call distribution system that provides queue and agent statistics, resulting from telecommunications events (i.e., service calls), for viewing on a monitor of a computer. A first server receives information associated with the telecommunications events, including queue and agent statistics, and places the information in a predetermined record format. The information is forwarded to a second server interconnected in a network. A module executed on a specific end node (e.g., computer) enables communications between the second server and the computer. This module is configured to control the computer to retrieve the information and create a display window to display contents of the information on the monitor in real-time.

13 Claims, 3 Drawing Sheets

US 6,882,724 B2

SYSTEM AND METHOD FOR PROVIDING CALL STATISTICS IN REAL TIME

CROSS REFERENCES TO RELATED APPLICATIONS

This is a continuation of U.S. patent application Ser. No. 09/189,094, filed Nov. 9, 1998, now U.S. Pat. No. 6,404,883 which is a continuation of U.S. patent application Ser. No. 08/670,834, filed Jun. 28, 1996, which has now matured to U.S. Pat. No. 5,864,616.

BACKGROUND OF THE INVENTION

1. Field of the Invention

The present invention relates to the field of software-based tools. More particularly, the present invention relates to a system and method that provide real-time queue and agent statistics through a display tool operating in a Windows™ environment.

2. Description of Art Related to the Invention

With the continual advancement of technology, many businesses have implemented or are in the process of implementing customer relation support groups having agents who provide technical advice, product information, and sales information to current and potential customers over the telephone. For large corporations selling a wide range of products, the support groups may be divided into a number of call centers trained to handle questions about specific product(s) or service(s).

Referring to FIG. 1, each agent of the support group currently is provided with a workspace having a computer 100 and a phone 110 from which the agent can "log" into a public branch exchange ("PBX") 120 remotely located from his or her workspace as shown. The PBX 120 performs the telecommunication switching of calls received from public telephone medium 130 (e.g., telephone lines as shown, radio frequency, etc.). When an agent "logs" into the PBX 120, the PBX 120 becomes aware that the agent is ready to receive calls from persons having questions regarding a specific product(s) or service(s) assigned to the agent. As the number of calls pertaining to the specific product(s) or service(s) increase and agents are temporarily unavailable, the PBX 120 temporarily places the caller on "hold" in accordance with a first-in, first-out "FIFO" queue located within the PBX 120, until a responsible agent is able to handle the call. The PBX 120 supports multiple queues.

The phone 110 includes a liquid crystal display 111 and one or more control buttons $112a$–$112n$ ("n" being arbitrary). The liquid crystal display 111 provides a limited display of alpha-numeric characters (e.g., 40 text characters). Upon depressing a first control button $112_1$, the agent is able to "log" into the PBX 120. Thereafter, upon depressing a second control button $112_2$, the agent is able to ascertain real-time queue statistics (e.g., number of calls outstanding) for the queue associated with the product(s) or services supported by the agent. Likewise, the second control button $112_1$ may be further depressed to ascertain call center or agent statistics such as the number of callers queued for other products supported by the technical support group, his or her individual or call center's statistics (e.g., average call time) and the like.

While the phone 110 may provide limited information to the agent, it possesses a number of disadvantages. One inherent disadvantage is that the phone 110 is separate from a personal computer from which the agents may be able to access information to answer various complex questions by the callers. Another disadvantage is that the liquid crystal display 111 of the phone 110 has limited viewing capability and is restricted to text characters which may be more difficult to reference and conveys less information than graphical illustrations. Yet another disadvantage is that an agent is only able to obtain information about queues that he or she has access (i.e., is "logged" onto the PBX that supports those queues). This poses a problem for agents receiving calls from other company owned call center sites, such as other remote PBXs, due to extreme call volume, temporary closure of the site in observance of a national holiday, or any other situations at the site.

A further disadvantage associated with the phone 110 is that it does not provide a broadcasting mechanism which would allow a supervisor of the call center support personnel to transmit an important message to a certain call center support group or to an individual agent.

Therefore, it would be advantageous to provide a local area network "LAN" based system and method that overcome the above-identified disadvantages.

SUMMARY OF THE INVENTION

The present invention relates to a display tool that provides queue and agent statistics resulting from telecommunications events which are viewed on a monitor of a computer in real time. A server receives the event information, including queue and agent statistics, and places the event information in a predetermined record format. When executed on the computer, a first module enables communications between the server and the computer by controlling the computer to retrieve the event information in a predetermined record format and creating a display window to display contents of the event information on the monitor in real-time.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention describes a display tool that provides real-time queue and agent statistics viewable on an information handling system (e.g., a desktop computer, laptop computer, or other hardware peripheral) operating in a Windows™ environment. As provided below, the following description is presented in terms of block diagrams and a flowchart which collectively are considered to be the most effective way to convey the substance of the present invention to those persons of ordinary skill in the art of software-based tools. However, programming code and well-known operations are not discussed in detail in order to avoid obscuring the present invention.

Some terminology specific to the PBX environment that supports the present invention is used to discuss certain well-known communication attributes. For example, a "telecommunications switch extension number" is a number utilized by a Call Data Collection System ("CDCS") to identifying the substantive nature of the call before routing the call to a particular vector. One type of telecommunications switch extension number is a vector directory number "VDN" used by a public branch exchange ("PBX"). A "vector" is a set of instructions on how to process the call while the CDCS monitors and stores information about each call. A "queue" is a holding area for calls waiting to be answered by a group of call center support agents and is identified in the PBX by a extension number with sub-extension numbers. System administrators are able to selectively configure the queues to support the mapping of one or more VDNs to that particular queue. An "agent" is anyone using the present invention to view real-time queue or agent statistics. A "module" is a telecommunications hardware device or a group of telecommunications hardware devices.

Figure 1:
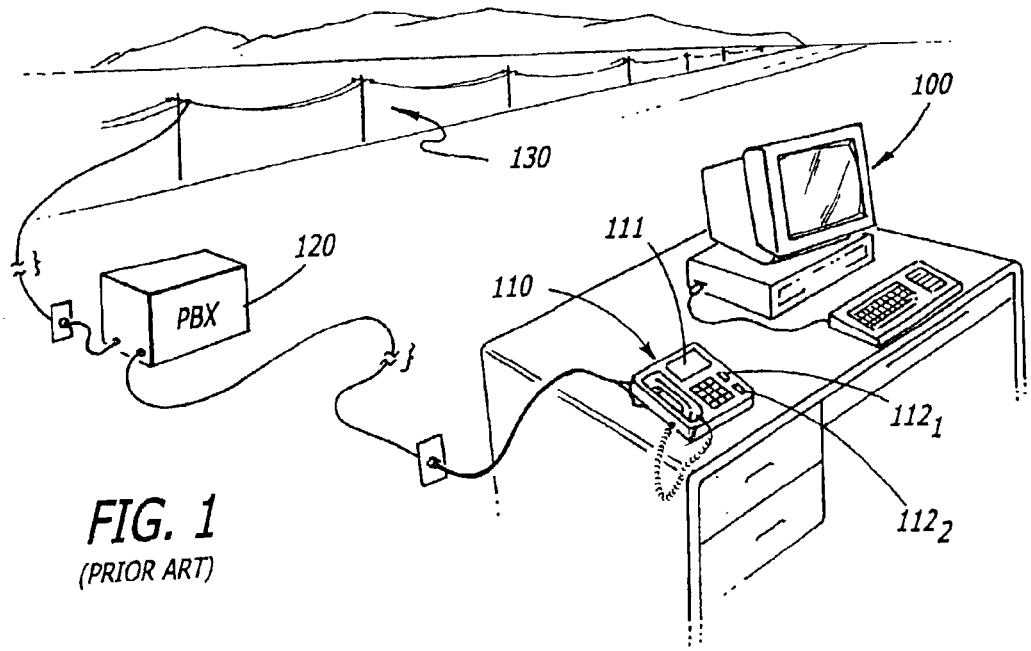
FIG. 1 is a block diagram depicting a conventional call center support phone including a liquid crystal display which precludes cross-site call center queue sharing.
Figure 2:
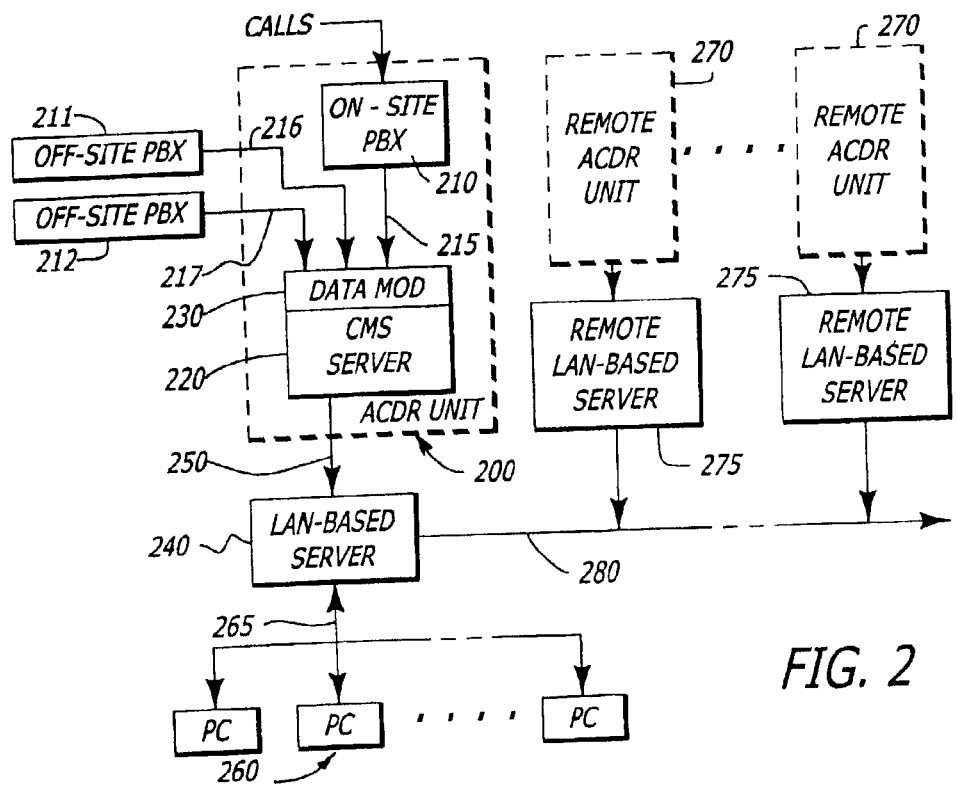
FIG. 2 is a system block diagram of one embodiment of the present invention in which a LAN-based server is configured to interact with an ACR system at its site and LAN-based servers connected to ACR systems at other sites to allow call center agents to view real-time queue information at multiple sites.

Referring now to FIG. 2, an illustrative block diagram of a system utilizing the desktop display tool is shown. With respect to a multiple-site business, each site normally includes an automatic call reporting ("ACR") system 200 to receive calls directed to phone extensions of that business site, to temporarily store calls in a preassigned queue located in a public branch exchange ("PBX"), to route the calls to specific end nodes (e.g., telephones, information handling systems such as computers, etc.), and to monitor predetermined statistics associated with the calls in real time. For clarity purposes, the ACR system 200 is an on-site PBX 210, working in combination with a Call Management System ("CMS") server 220. The CMS server 220 is, for example, one manufactured by American Telegraph and Telephone Company ("AT&T"). It is contemplated that other telephone routing and monitoring equipment from other manufacturers may be substituted for the CMS server 220.

The calls directed to the "on-site" ACR system 200 and possibly other calls directed from one or more off-site ACR systems (e.g., two off-site PBXs 211 and 212) are coupled to the CMS server 220 through dedicated lines 215–217. Each of the lines 215–217 is preferably, but not exclusively, a "T1" communication channel. A "T1" communication channel is capable of supporting twenty-four (24) distally multiplexer simultaneous voice channels. A well-known AT&T hardware routing device referred to as a "data mod" 230 may be interposed between the PBXs 210–212 and the CMS server 220 to obtain specific data from the PBXs 210–212 via lines 215–217 and to transfer that data to the CMS server 220 through at least one voice channel. This data pertains to call activity and agent statistics, which may include, but are not limited to a vector directory number ("VDN"), a number of calls waiting in the queue associated with the VDN, time duration of the oldest call still in the queue and the site identification number associated with this information. It is contemplated, however, that other types of ACR systems may not require the data mod 230.

Figure 3:
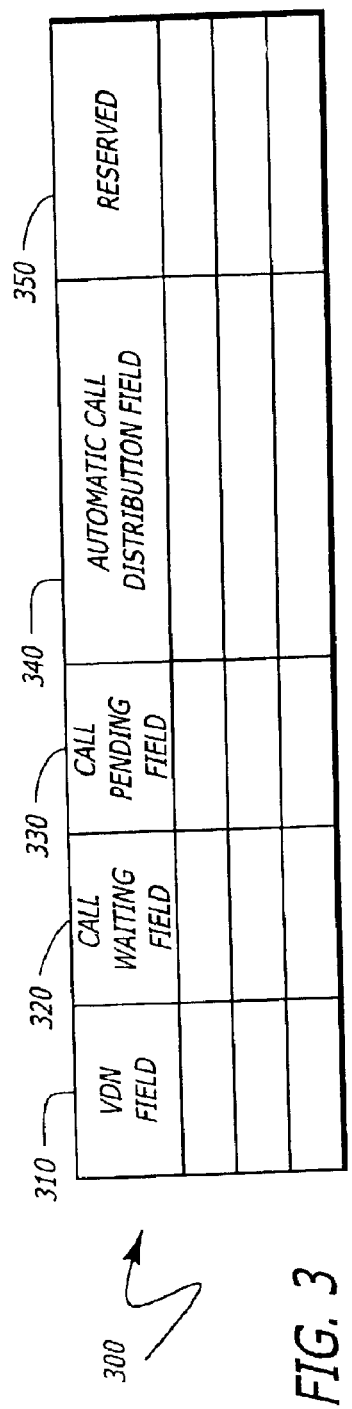
FIG. 3 is a representation of one embodiment of a file structure utilized by an ACR system to collect data pertaining to queue status and agent statistics.

Referring still to FIG. 2, the CMS server 220 operates as a database to measure call activity and store the selected data. More particularly, for the purposes of this present invention, the CMS server 220 includes (i) hardware (e.g., volatile memory) to store information including the specific data within a selected number of records forming a file structure as shown in FIG. 3, and (ii) software to control the storage of the specific data within that file structure. Besides being connected to each PBX 210–212 through the data mod 230, the CMS server 220 is also connected to a local area network ("LAN") based server 240 through transmission lines 250 operating under a network communication protocol such as Transmission Control Protocol/Internet Protocol ("TCP/IP"). The transmission lines 250 that supports a limited bandwidth ranging from 10 million bits per second ("Mbps") up to 100 Mbps for FastEthernet™ physical medium.

The CMS server 220 periodically sends VDN and other information to a LAN-based server 240, running a software application (e.g., Microsoft® Windows NT™, Version 3.5.1) under TCP/IP by which information handling systems, computers for example, communicate with each other. A software program (e.g., SQL Server™, Version 6.0), operating on the LAN-based server 240, is configured to receive data from CMS server 220 and store the data on a Microsoft SQL Server ("SQL Server") database that also resides on the LAN-based server 240. Microsoft® Windows™ and SQL Server™ are software programs created by Microsoft Corporation located in Redmond, Wash. Communication between the program that receives the data from CMS server 220 and the SQL Server database is provided by Borland Database Engine "BDE" (Version 2.5 for 16-bit, Version 3.0 for 32-bit) and the Borland SQL Links "SQL Links" (Version 2.5 for 16-bit, Version 3.0 for 32-bit) software which are not illustrated. The BDE and SQL Links are software products created by Borland International of Scotts Valley, Calif. that enable the development of software that can utilize databases.

Referring now to FIG. 3, the data structure associated with information transferred from the CMS server to the LAN-based server includes a "Vector Directory Number" ("VDN") field 310, a "Call Waiting" field 320, a "Call Pending" field 330, an "Automatic Call Distribution" field 340 and an additional field 350 reserved for future development needs. The VDN field 310 is configured to contain a VDN associated with the call. This VDN provides information about the nature of the call (e.g., to which specific product or service the call is directed). The Call Waiting field 320 is configured to contain the number of calls associated with the VDN that are awaiting assistance by one of the agents. The Call Pending field 330 is configured to contain a time value (e.g., seconds) on the longest duration a call has been waiting in the queue. Finally, the Automatic Call Distribution ("ACD") field 340 is configured to contain information which identifies to which site the call is directed. This information allows the CMS server to display information about queues at other sites. For each VDN in all the ACR systems that the CMS server measures, these five fields are sent to the LAN-based server at an interval specified on the CMS server. The interval is greater than four seconds, and usually, is at least 15 seconds in duration to reduce the amount of network traffic created by sending the VDN and other information.

Referring back to FIG. 2, the LAN-based server 240 is connected to the information handling systems, for example personal computers 260, of the agents via a local area network ("LAN"). Each of these personal computers 260 runs a program that creates a display shown on a monitor of the computer (see FIGS. 4–5) and establishes a communication link 265 with the LAN-based server 240 to retrieve the queue information stored on the SQL Server database. Likewise, the LAN-based server 240 may be connected to other remote ACR systems 270 at remote sites through its corresponding remote LAN-based servers 275 connected to the LAN-based server through a wide area network ("WAN") communication link 280. As a result, agents from one site would be able to monitor queues normally supported by other sites which is currently not available in connection with prior art techniques.

Figure 4:
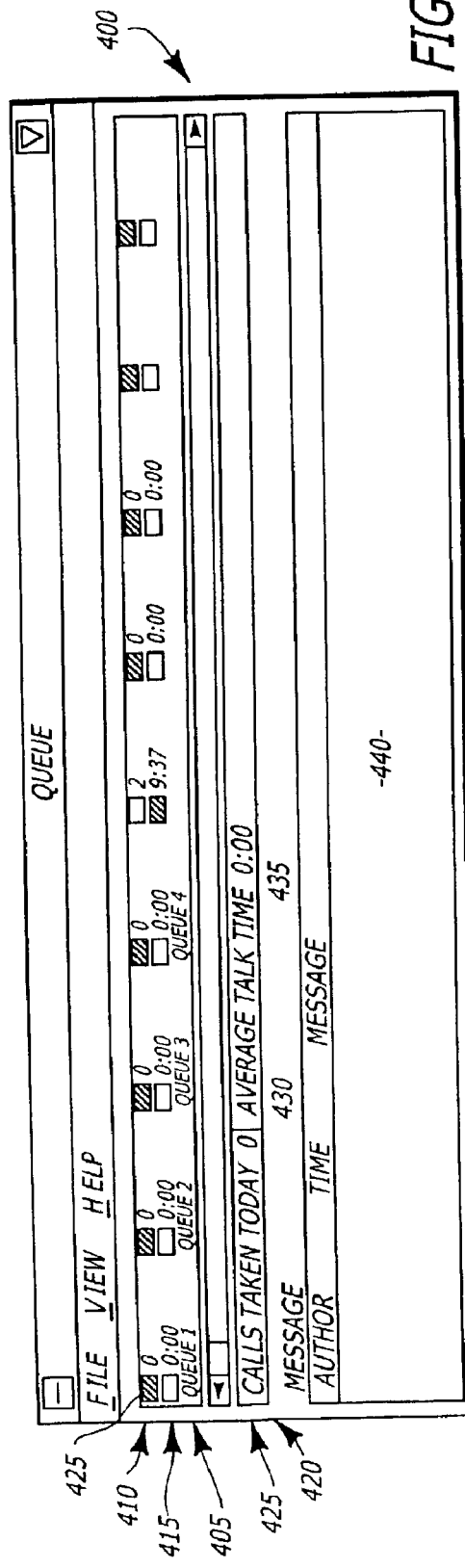
FIG. 4 is a perspective view of one embodiment of the screen display associated with the present invention.
Figure 5:
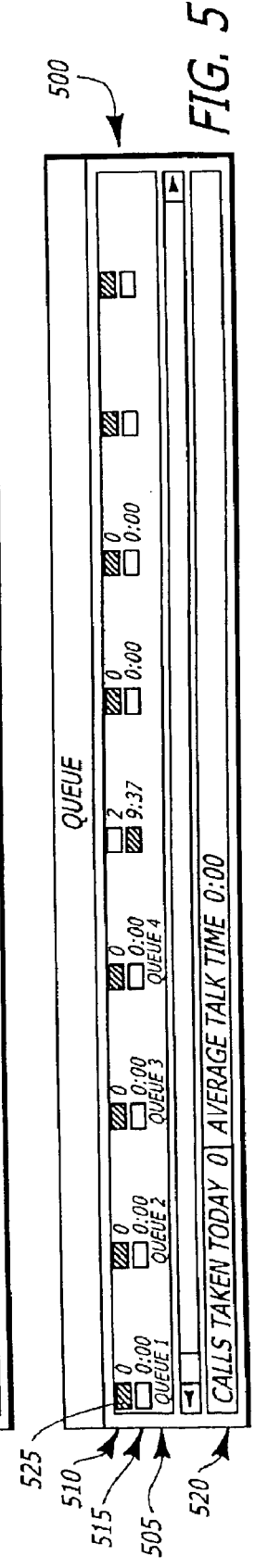
FIG. 5 is a perspective view of another embodiment of the screen display associated with the present invention.

Referring now to FIGS. 4 and 5, two embodiments of the screen display produced by the program that is executed by the computer are shown. These two embodiments represent a full-size display 400 and a reduced-size display 500 as shown in FIGS. 4 and 5, respectively. Each of these display embodiments presents information for the queues that the agent provides service. For both embodiments of the screen display, an agent can view (i) the name of the queue 405 and 505, (ii) how many calls are waiting to be served 410 and 510; (iii) how long has the call that has been waiting the longest amount of time been waiting 415 and 515; and (iv) how many calls have been answered today by all agents for this queue 420 and 520.

The status of the queue is further depicted by the display of a colored coded box 425 and 525 that informs the agent of the current state of the calls waiting to be served and the longest call waiting. By changing from green to yellow to red depending on the predetermined threshold values, these boxes 425 and 525 give agents an intuitive visual status of the queues that they service.

The full-sized and reduced-size displays 400 and 500 also include an area designated to display agent statistics. This area displays the number of calls handled by the agent (e.g., field 430) and the average time of each service call handled by the agent (e.g., field 435) for the current day. These agent statistics are provided so that the agent has feedback on whether he or she is being efficient in his or her assigned task. These agent statistics as well as the queue information are updated after a predetermined period of time has elapsed (e.g., approximately 15 seconds for queue information, approximately 30 minutes for agent information).

Differing from the reduced-size display 500, the full-size display 400 further includes an area 440 that is used to display broadcast messages that can be sent by supervisors. Messages can be cleared by double-clicking on them or clicking once and pressing the delete key. The primary purpose of the message is to serve as a means for call center-wide notifications to be communicated. The reduced-size view of FIG. 5 will expand to a full-size in the event that a message is delivered. The main purpose for having the reduced-size screen is to limit the amount of screen space that the program takes up, since it will be running on the agent's desktop at all times.

Other features include the ability to have the screen stay visible at all times regardless of how many other Windows™ programs are running by configuring the display to always be on top and the ability to customize the display (threshold box size and distance between queues).

Figure 6:
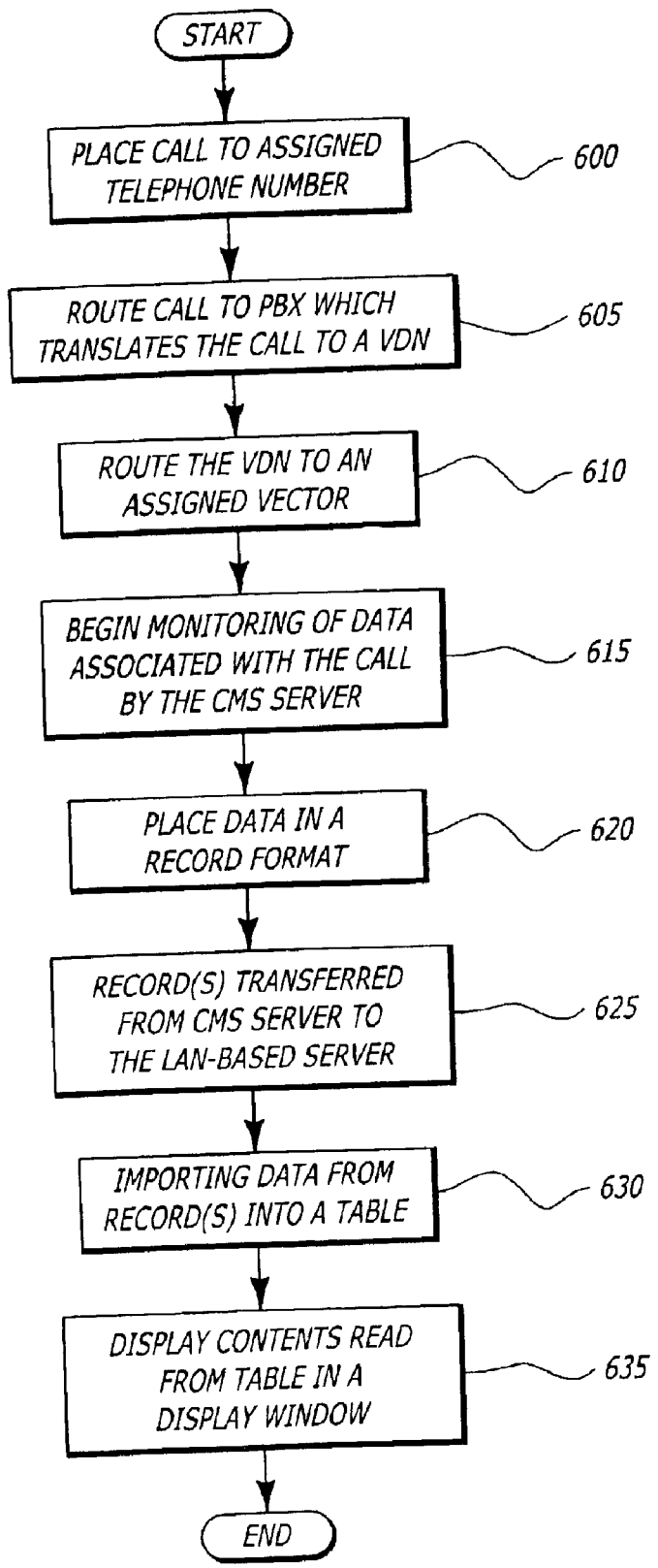
FIG. 6 is a flowchart illustrating the operations of the present invention.

Referring now to FIG. 6, a flowchart representing the operations of transferring data in the form of queue status and agent statistics through the file structure of FIG. 3 between the ACR system(s) and the LAN-based server within the AT&T PBX and CMS environment is shown. For clarity, the ACR system is the PBX and CMS server hardware devices. First, in step 600, an individual places a call to a particular business using an assigned telephone number. The call is routed to the PBX which translates the digital data associated with the telephone number into a VDN (Step 605). This may be accomplished by removing one or more numbers associated with the telephone number or creating a VDN independent of the telephone number. The VDN is routed to a vector which is assigned to process the call (Step 610). Such processing may be performed through automatic routing or voice announcements prompting the caller to select numbers to route the call. Upon routing the call to a queue extension via the vector, the call is monitored by the CMS server (Step 615).

More particularly, the CMS server is configured to monitor particular data associated with each VDN and place the data in a CMS defined record format (Step 620) of the file structure before retrieval to the agent's computer executing a software application in the background. The executable software application contained in each personal computer may be configured to retrieve the particular data stored in the file structure after a preselected duration being in minutes and/or in seconds (e.g., 15 seconds).

The contents of a particular record(s) of the file structure are transferred to the LAN-based server through a selected port assigned for communication with the LAN-based server upon request by the LAN-based server (Step 625). The contents are imported into a table (e.g., a table having a Microsoft SQL™ format) from a first format utilized by the CMS server (Step 630), and then read by the executable software application running on the personal computers. Thereafter, the contents are displayed in a display window configured as shown in FIG. 4 or 5 to provide the agent queue status and/or his or her statistics (Step 635).

The present invention described herein may be designed in many different embodiments as evident to one skilled in the art than those described without departing from the spirit and scope of the present invention. The invention should, therefore be measured in terms of the claims which follow.

What is claimed is:

1. A computer readable medium having embodied thereon a computer program for processing by a machine, the computer program comprising:

a first routine for obtaining first data pertaining to an incoming call activity of telecommunication events from a first site;

a second routine for forming the first data in a first predetermined data structure format;

a third routine for receiving the first data periodically by a local server;

a fourth routing for obtaining second data pertaining to an incoming call activity of telecommunication events from a second site;

a fifth routing for forming the second data in a second predetermined data structure format;

a sixth routing for receiving the second data periodically by a remote local server, the local server being connected to the remote local server via a wide area network communication link to monitor the second data, the second data including information on a second queue at the second site;

a seventh routine for retrieving one of the first and second data by an executable application, the second data originating from the remote local server; and an eighth routine for creating a display window to display, in real-time and in one of a graphical and textual representations, agent statistics.

2. The computer readable medium of claim 1, wherein the second routine for forming includes loading a vector directory number into a first field of the predetermined data structure format to provide information concerning a telephone call.

3. The computer readable medium of claim 2, wherein the second routine for forming further includes loading a number of outstanding telephone calls associated with the vector directory number that are awaiting service into a second field of the predetermined data structure format.

4. The computer readable medium of claim 3, wherein the second routine for forming further includes loading a time value indicating a longest duration that one of the number of outstanding telephone calls has been awaiting service.

5. The computer readable medium of claim 1, wherein the telecommunications events includes a telephone call.

6. The computer readable medium of claim 5, wherein the second routine for forming includes loading a vector directory number into a first field of a data structure, the vector directory number to provide information concerning the telephone call.

7. The computer readable medium of claim 6, wherein the second routine for forming further includes loading a number of outstanding telephone calls associated with the vector directory number of outstanding telephone calls associated with the vector directory number that are awaiting service into a second field of the first predetermined data structure format.

8. The computer readable medium of claim 7, wherein the second routine for forming includes loading a time value indicating a longest duration that one of the number of outstanding telephone calls has been awaiting service.

9. The computer readable medium of claim 8, wherein the second routine for forming includes loading information into a fourth field, the information identifying one of a plurality of sites to which one of the plurality of telephone calls is directed.

10. A computer readable medium having embodied thereon a computer program for processing by a machine, the computer program comprising:

a first routine for obtaining first data pertaining to an incoming call activity of telecommunication events at a local site;

a second routine for forming the first data in a predetermined data structure format;

a third routine for receiving the first data periodically by a local server, the local server being connected to a remote local server via a wide area network communication link to monitor second data, the second data including information on a second queue at a remote site;

a fourth routine in executable application for retrieving one of the first and second data, the second data originating from the remote local server; and a fifth routine for creating a display window to display the agent statistics in real-time and in one of a graphical and textual representations.

11. The computer readable medium of claim 10, wherein the second routine for forming includes loading a vector directory number into a first field of the predetennined data structure format to provide information concerning a telephone call.

12. The computer readable medium of claim 11, wherein the second routine for forming further includes loading a number of outstanding telephone calls associated with the vector directory number that are awaiting service into a second field of the predetermined data structure format.

13. The computer readable medium of claim 12, wherein the second routine for forming further includes loading a time value indicating a longest duration that one of the number of outstanding telephone calls has been awaiting service.

* * * * *

UNITED STATES PATENT AND TRADEMARK OFFICE
CERTIFICATE OF CORRECTION

PATENT NO. : 6,882,724 B2
DATED : April 19, 2005
INVENTOR(S) : Hartmeier

It is certified that error appears in the above-identified patent and that said Letters Patent is hereby corrected as shown below:

Column 8,
Line 21, delete "ofclaim" and insert -- of claim --.
Line 23, delete "predetennined" and insert -- predetermined --.

Signed and Sealed this

Sixteenth Day of August, 2005

JON W. DUDAS
*Director of the United States Patent and Trademark Office*